(12) United States Patent
McBride et al.

(10) Patent No.: US 8,538,987 B1
(45) Date of Patent: Sep. 17, 2013

(54) CARE AGENT CALL CLASSIFICATION

(75) Inventors: Cynthia L. McBride, Olathe, KS (US); John C. Proctor, Leawood, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 173 days.

(21) Appl. No.: 13/154,439

(22) Filed: Jun. 7, 2011

(51) Int. Cl.
*G06F 7/00* (2006.01)

(52) U.S. Cl.
USPC .......................................................... 707/776

(58) Field of Classification Search
USPC ......................................... 707/776; 379/265
See application file for complete search history.

(56) References Cited

U.S. PATENT DOCUMENTS

| | | | |
|---|---|---|---|
| 5,168,515 A * | 12/1992 | Gechter et al. | 379/265.04 |
| 5,825,869 A * | 10/1998 | Brooks et al. | 379/265.12 |
| 7,023,979 B1 * | 4/2006 | Wu et al. | 379/265.11 |
| 8,175,253 B2 * | 5/2012 | Knott et al. | 379/265.03 |
| 2005/0021713 A1 * | 1/2005 | Dugan et al. | 709/223 |
| 2007/0076853 A1 * | 4/2007 | Kurapati et al. | 379/1.01 |
| 2011/0161367 A1 * | 6/2011 | Ishikawa et al. | 707/776 |

* cited by examiner

*Primary Examiner* — Pierre Vital
*Assistant Examiner* — Courtney Harmon

(57) ABSTRACT

A computer-based method of analyzing call center data comprising collecting reports from customer care agents, wherein the reports comprise logged data of incoming customer calls; compiling the reports into a first data set; dividing the first data set into categories based on the incoming calls; determining a distribution within the categories; removing suspect data from the first data set to form a groomed data set; determining a distribution within the categories of the groomed data set; comparing the distribution of the first data set to the distribution of the groomed data set to form a confidence value; determining limits for a deviation of the data of the reports from the distribution of the groomed data set; comparing the deviation of a given customer care agent to the limits; and taking an action based on the comparing.

20 Claims, 7 Drawing Sheets

160

CALL RECORD

210 — Incoming Number: (123)456-7890

220 — Customer Name: J. Doe

230 — Call Duration: 5.5 minutes

240 — Issue:
- ☐ Dropped call — 250
  - ☐ during call
  - ☐ while dialing
- ☐ Cannot call some areas — 260
  - ☐ domestic
  - ☐ international
- ☑ Hardware issue — 270
  - ☐ earphone
  - ☐ microphone
  - ☐ keyboard
  - ☑ display
- ☐ Billing Issue — 280
  - ☐ payment not credited to account
  - ☐ no bill received
  - ☐ incorrect amount billed

FIG. 2

CARE AGENT CALL CLASSIFICATION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Businesses may track incoming calls to customer support centers for quality control purposes. Customer care agents may receive calls and log data regarding the details of the incoming calls into a database. This database may then be used to identify problems relating to areas such as hardware, software, infrastructure, business practices, customer satisfaction, and such.

SUMMARY

In an embodiment, a computer-based method of analyzing call center data is disclosed. The method comprises collecting reports from customer care agents, wherein the reports comprise logged data of incoming customer calls; compiling the reports into a first data set; dividing the first data set into categories based on the incoming calls; determining a distribution within the categories; removing suspect data from the first data set to form a groomed data set; determining a distribution within the categories of the groomed data set; comparing the distribution of the first data set to the distribution of the groomed data set to form a confidence value; determining limits for a deviation of the data of the reports from the distribution of the groomed data set; comparing the deviation of a given customer care agent to the limits; and taking an action based on the comparing.

In an embodiment, a computer-based method of analyzing call center data is disclosed. The method comprises collecting data of incoming customer calls into a first data set, dividing the first data set into categories, based on types of incoming customer calls in the first data set, and determining a distribution of the data within a first category of the first data set. The method further comprises analyzing the distribution of the data within the first category, removing suspect data from the first category to form a first groomed data set, determining a groomed distribution within the first category, and identifying valid customer service issues, based on analyzing the groomed distribution within the first category.

In an embodiment, a computer-based method of analyzing call center data is disclosed. The method comprises collecting data of incoming customer calls to form a first data set. dividing the first data set into categories, and removing suspect data from a first category of the first data set to form a first groomed data set. The method further comprises analyzing the first groomed dataset to identify outlying data, removing the outlying data from the first groomed data set, determining a distribution of the first groomed data set, and setting alarm levels at predetermined levels to indicate areas of concern, based on the distribution of the first groomed data set.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 2 illustrates a call record, according to an embodiment of the disclosure.

DETAILED DESCRIPTION

Figure 1:
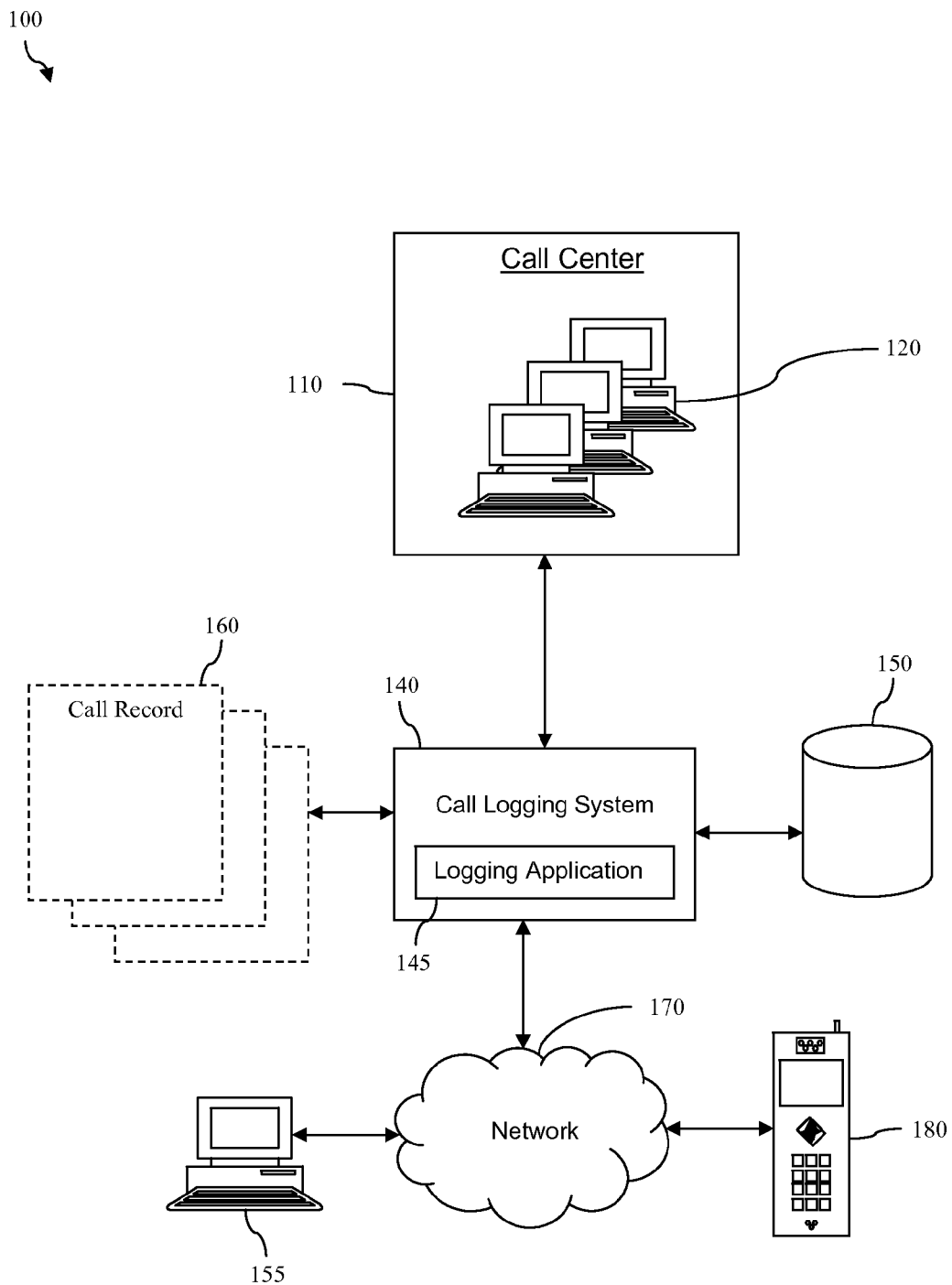
FIG. 1 illustrates a call center management system, according to an embodiment of the disclosure.

It should be understood at the outset that, although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Customer care centers are generally provided with customer care agents to take incoming customer calls and help customers resolve issues. In some instances, call center management may provide customer care agents with a computerized call logging system in order to capture data pertaining to the incoming customer calls for subsequent analysis. Call logging systems may provide agents with electronic check-boxes, drop-down menus, text boxes, and/or other ways of capturing and logging data from incoming customer calls.

While customer care agents may be trained in the procedures for properly logging calls, in some cases agents may not always adhere strictly to these procedures. For example, some agents may not be diligent at logging calls as they are received. These agents may then attempt to log data from memory at the end of their shifts, in order to account for their work. This may lead to confusing data, which may or may not be intentional. Some agents may fail to go through the proper steps, for a variety of reasons. Others may select the quickest and/or easiest check-boxes or drop-down menus, rather than going through the additional effort required to correctly capture data of incoming calls.

These faulty procedures may produce a call center database that contains misleading data of customer calls. These inaccurate data may lead management to misdirect resources to areas that may not actually be in need of them or to not recognize actual problems, which may result in a reduction in customer satisfaction, misaddressed or unidentified issues, wasted resources, and/or loss of market share.

In an embodiment, a method is taught for analyzing call center log data. The method comprises collecting data of incoming call logs and determining a distribution within each of the categories of the logged data. Call logs generally comprise categorized information pertaining to incoming calls from customers. For example, when a customer calls into a call center, a customer care agent may maintain a computer-based log that captures relevant information relating to the call. This may be in a hierarchical format, such that as the customer care agent asks the customer questions and receives responses, the customer care agent may make selections from various categories in a call log, to indicate the reason for the customer's call. By way of example, a customer may call in to complain about a billing issue with the customer's account. Upon learning this, the customer care agent may select a first category designated "customer complaint" and a second category or a subcategory designated "billing issue". Upon further inquiry, the customer care agent may learn that the specific complaint is that the customer was bill for more service than they contracted for. The customer care agent may then select a subcategory under the "billing issue" category of "incorrect billing amount", and so forth. This process generally results in call logs that comprise a series of categorical data that is arranged in a bin-like configuration. This data may be collected and analyzed to identify issues and/or problems that a company should address, in order to provide exceptional customer service.

Analyzing this data may be in the form of determining a distribution among the categories and subcategories of the call logs. For example, an average of the number of incoming calls that specify each of the multiple categories and/or subcategories may be determined. Examples may be the average number of complaints of dropped calls, malfunctioning keyboards, regarding billing issues, and so on. Within each category and/or subcategory, there may be a number associated with how many of each call each agent of the call center received, over a period of time. Analyzing this data for each customer care agent may result in a distribution among agents, as to how many of each type of call was received by each agent. Thus, the categories and/or subcategories of the logged data may have a distribution. Analyzing this distribution may help identify outlying data that may be suspected of being falsified or invalid for any of a variety of reasons.

The method then provides for setting limits for how much deviation from the distribution is acceptable. Data logs of individual agents may then be compared to the distributions, in order to aid in detecting whether or not the customer care agent is accurately logging calls. If the agent's log data deviates from the distribution more than the limit, the agent might be further investigated for incorrectly logging data. In addition, the method provides for setting the questionable data aside, in order to avoid misdirection of resources, based on conclusions drawn from faulty data.

In an embodiment, a method is taught for identifying valid customer service issues. The method teaches removing spurious customer call log data from call center logged data to permit separating valid issues from false issues that may arise from faulty call logging. In order to identify questionable data, the original data set may be divided into categories such as by category, sub-category, sub-sub-category, and so on. The resulting categories may then be analyzed by determining a distribution and/or an average for each sub-category with the categories. As an example, 10 customer care agents each log 100 calls per day, and of the resulting 1000 logged calls, there is an average of 100 calls per day in which customers complain that the amount of their bill is incorrect. In this example, the expected percentage of incoming calls with the "incorrect billed amount" designation would be 10%. By then comparing individual customer care agents' logged data to this average for this category of call, false and/or questionable data may be flagged and subsequently deleted or set aside. If, for example, a particular agent's number of logged calls designated as "incorrect billed amount" is 50%, instead of the 10% average exhibited by the bulk of the agents, it may be an indication that the customer care agent is not properly logging their calls.

This process may be repeated for all categories and/or subcategories of the data. Questionable data from selected agents may then be identified, flagged, and/or removed from the original data set to produce a "groomed data set." In this manner, the groomed data set may comprise data that may more appropriately be used to identify areas that are of concern and may need attention. This may provide cost savings associated with avoiding wasted resources resulting from chasing false indications derived from faulty call log data. This groomed data set may then be more effectively utilized to identify valid concerns gleaned from the call logs. For example, the groomed data may provide management with the opportunity to determine which areas of customer billing concerns they should direct resources to, in order to appropriately solve issues, in hopes of increasing customer satisfaction and/or market share.

In an embodiment, a method is taught for setting alarm levels for call log data. The method teaches setting alarm levels such that, for example, when a specified number of calls are logged for a given category, steps may be taken to indicate that the alarm level has been reached, in order to draw appropriate attention to the problem. This may permit management to recognize and respond to critical situations in a timely fashion when incoming calls indicate a problem in a specific geographic region, with a particular piece of hardware of software, or in part of the business that directly impacts customers.

Turning now to FIG. 1, a customer care center 100 is illustrated. The customer care system 100 comprises a call center 110 which includes a plurality of customer care agent terminals 120, a call logging system 140, a logging application 145, a database 150, a manager terminal 155, a plurality of call records 160, a network 170, and a mobile device 180. The call logging system 140 is accessed through the customer care agent terminals 120, and call records are captured by the call logging system 140 and stored in the database 150. The call logging system 140 may also be accessed by the manager terminal 155.

In operation, the customer care system 100 may include a plurality of customer care agent terminals 120 for logging incoming calls. For the sake of discussion, it will be understood that each terminal will typically be staffed by a customer care agent that is tasked with receiving incoming customer call and logging data relating to said calls, accordingly. It should also be understood that the customer care agents may have been appropriately trained in the proper use of the terminal 120, the call logging system 140 and procedures for properly recording data via the call records 160. For example, a customer may call the call center 110 via mobile device 180. The call may be via any appropriate conveyance or system, such as phone lines or a network such as network 170. When the call is answered by an agent of the call center 110, the agent may open a new call record 160, via the terminal 120. The terminal 120 may display a computer-based representation of the call record 160 for the agent to fill out. As the agent takes the call, he/she may ask the customer a series of questions in order to determine the details of the customer's issue.

The agent may input information relating to the customer call into the call record 160, as the conversation progresses.

FIG. 2 illustrates examples of possible details in a call record 160. The call record 160 may be presented on a computer screen of a customer care agent terminal 120 as a graphical user interface, and the associated logged data may be stored in the database 150 in tabular form or other suitable database form. The call record 160 on the customer care agent terminal 120 may contain numerous options for the agent to select in order to capture the relevant details of the customer call. For example, the call record 160 may comprise typed-in fields into which the agent may input information of the call such as the customer's name, phone number, and such. The call logging system 140 may alternatively be capable of capturing the phone number of the incoming call such that the agent need not type that field in manually. This may be accomplished by, for example, a caller identification system (e.g. caller id), as one of ordinary skill in the art may know. The call record 160 may also comprise fields that are automatically entered by the call logging system 140, such as call duration.

Call record 160 comprises incoming number 210, customer name 220, call duration 230, issue 240, and a variety of issues 250-280 that a customer may experience when having issues with a mobile device or such. In this example of a call record, issues such as "dropped call" 250, "cannot call some areas" 260, "hardware issue" 270, and "billing issue" 280 are illustrated, but as one of ordinary skill in the art will realize, any number or type of issues may be incorporated into a call record in order to adequately and accurately capture information about customer complaints or other relevant issues. In the example call record of FIG. 2, the incoming phone number 210 is (123)456-7890, the customer name 220 is J. Doe, and the call duration 230 is 5.5 minutes. Also, in this example, the issue 240 that caller J. Doe has called in is a hardware issue 270, in which the particular complaint is that the customer has a problem with the display of their unit, as indicated by the checked box in the illustration.

As a call progresses, the agent may select categories within the call record 160 pertaining to customer issues such as the type of issue, (e.g. dropped call, inability to call certain geographic regions, customer hardware problems, and billing issues). In order to maintain a level of consistency within the records of database 150, the call records 160 records may comprise drop-down menus, radio buttons, check boxes, and/or similar selections that provide pre-determined categories and/or subcategories of data for the agent to capture and log for each incoming customer call. Within each category of issue, the call record 160 may comprise sub-categories to further define the customer complaint. The sub-categories may then further be divided and/or subdivided, as may be necessary in order to fully capture salient data pertaining to customer complaints/issues.

Customer care agents may be taught the necessity of properly filling in the information pertaining to incoming calls accurately. Customer care agents may also be instructed in the proper use of the call logging system 140, in terms of properly filling in information on the call records 160. In some cases, however, the data may not be correctly logged. This may be for a variety of reasons. For example, a customer care agent may inadvertently choose the wrong selection and mis-categorize a call. It is also possible that a customer care agent may carelessly choose an incorrect option in the call record 160. It is also possible that a customer care agent may be filling in erroneous information intentionally. It may be that a customer care agent is lazy and does not like having to fill in all of the information required to properly log a call. This lazy agent may hurriedly select the easiest and/or most convenient options on call record 160, in order to get a call logged, without having to take the time necessary to complete the call record 160 properly.

As an example, a call center 110 may be managed such that customer care agents are rewarded for the number of calls they log. In this case, a nefarious customer care agent may generate extra, false records that are not derived from real customer calls. This agent may do so in order to inflate the number of calls they appear to have received, in order to better their position, with respect to the number of logged calls and the associated rewards. This may lead to false records that do not accurately reflect customer calls.

In another example, a lazy customer care agent may not log calls as received, and may then attempt to fill in call records 160 after calls are completed, instead of doing so dynamically, as the calls progress. This may also lead to mistakes in the call record 160, due to the agent's inability to recall details of the customer call. The customer care agent may even wait until the end of their shift and attempt to fill in multiple call records 160 for the numerous calls they received during their shift. This can also lead to erroneous call records 160. For example, if a customer care agent attempts to log multiple calls, but does not have notes on the calls, and/or cannot remember some of the details of the calls, they may resort to making up data to enter into the call records 160. They may, for example, make up phone numbers, names, and/or other typed-in entries. They may also select categories and/or sub-categories randomly, or may systematically choose quick and/or easy categories, in order to rapidly enter multiple call records 160 as their shift ends.

False and/or misleading call records 160 may result from other reasons. For example, false data may merely be the result of a call that terminated prematurely. For example, if a customer calls the call center 110, and an agent begins logging the call, but the customer call drops prior to completion of the call, the call record 160 may comprise inadequate information to properly indicate the customer's true reason for calling. In this scenario, it may be advantageous to remove these incomplete calls from the call logging system 140 to avoid making decisions based on incomplete data. It may be possible to identify incomplete calls by setting a threshold time for a call, in order to remove calls that appear to be too short to actually glean viable information. For example, calls that last less than 30 seconds or so may be removed from the call logging system 140, under the assumption that a 30 second call could not be adequately long to correctly identify a customer's reason for calling. In an embodiment, any appropriate amount of time may be defined, in order to identify a call that is deemed too short to be believed to provide a viable call record 160.

Erroneous call records 160 in the call logging system 140 can lead to poor decisions on the part of those who rely on these data to address customer concerns. For instance, a business's management may scrutinize data from the call logging system 140 to determine what issues their customers are experiencing, so that the issues may be address. This may be done to maintain and/or increase customer satisfaction, which can affect customer loyalty, market share, profitability, and such. For example, if data from the call logging system 140 indicates that customers are having numerous reliability problems relating to a product, such as a mobile device, management may devote resources to fixing problems with the mobile device. They may spend money and devote employees to a project to determine the cause of the problem or problems, and may end up incurring numerous expenses relating to this troubleshooting effort. If, in fact, these decisions are founded in erroneous data from the call logging system 140, these resources may be wasted in chasing a problem that may not even exist. For these and other reasons, reliable data in the call logging system 140 may be important to a business.

Figure 3:
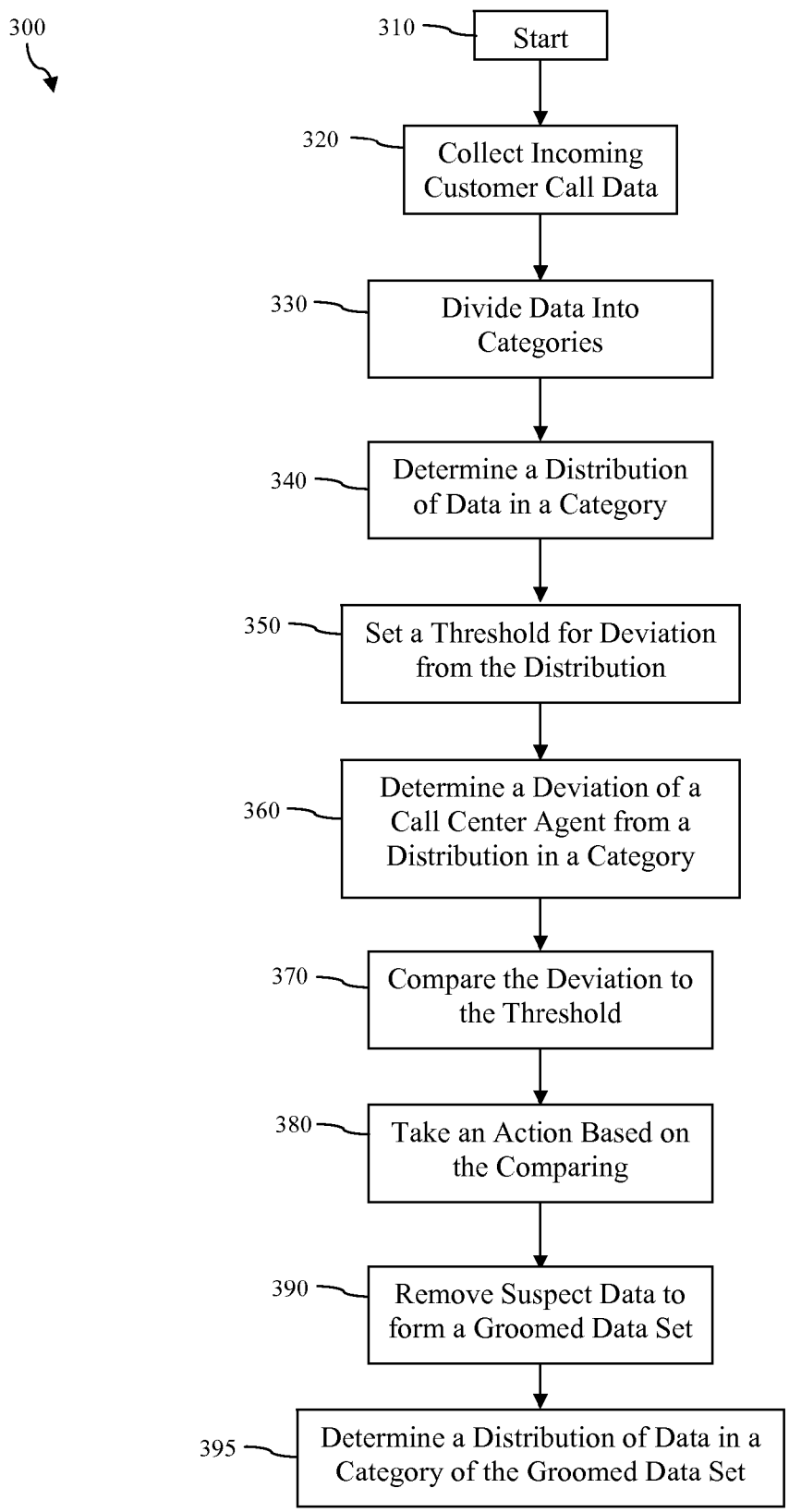
FIG. 3 is a flow chart, according to an embodiment of the disclosure.

FIG. 3 shows a flowchart of a method 300 of an embodiment of the disclosure. In step 310, method 300 begins. In step 320, incoming call data is collected.

In step 330, the data set is divided into categories. The data may be divided into relevant categories such as the nature of the complaint, the region the call is from, or other such categories as the call log record may comprise, and as may be desirable for future record searching and system troubleshooting.

In step 340, a distribution within each of the categories is determined. For example, an average may be determined, such as an average number of each type of issue that is received by a number of customer care agents. This may simply be a matter of looking at all of the calls received over a period of time in which the customer issue is, for example, "too many dropped calls". In this example, in the course of a week, the number of customer calls with "too many dropped calls" as the issue, sorted by each customer care agent, may yield a distribution such that 20 customer care agents have an average of 10 calls per day, or 70 calls per week. This, therefore, would be the relevant distribution for this particular customer issue.

In step 350, a threshold for deviation from the distribution is determined. A deviation may be any form of deviation from the distribution. A deviation threshold may be an absolute deviation, as in a pre-defined number away from the distribution, for example, 10. If then, in this example, the average number of calls with a logged number of "keyboard failure" issues is 50 per week for all of the customer care agents in the call center 110, and a specific agent only logs 30, this call care agent's data may be flagged as suspect, as their absolute deviation from the distribution is 20, and the and the threshold is 10. The deviation may alternatively be defined as a standard deviation from the distribution, as one of skill in the art would be familiar. In an embodiment, any form of or formula for a deviation may be used to determine whether or not a specific customer care agent's data is valid or is suspect.

In step 360, a deviation of the data of a specific agent of the call center is determined. As described above, the data of a specific customer care agent may be compared to the distribution in the categories describe in step 330, above. This may help indicate whether or not the data captured by the customer care agent is valid data, or if it may have been falsified or is in some other way invalid.

In step 370, the deviation of the specific customer care agent, as determined above in step 360, is compared to the threshold. If the deviation is greater than the determined acceptable level of deviation, the customer care agent's data is considered suspect.

In step 380, an action is taken, based on the deviation. An action such as managing customer care agents that exhibit deviation from the distribution that is beyond the threshold. Managing the customer care agents may include additional training for the customer care agent, closer monitoring of the customer care agent, replacement of the customer care agent, or other forms of managing the customer care agents, in order to bring the customer care agent's data logging skills and/or habits in line with acceptable methods.

In step 390, the suspect data from step 370 may be removed to form a groomed data set. For example, in order to generate a more reliable data set that has had suspect data removed, a manager may review the findings described above, and may determine that the call record 160 data of a particular customer care agent is suspect, and that removing it from the database may yield a more valuable data set (e.g. a groomed data set). In this way, data that is invalid for any of a variety of reasons may be removed from the data set, and thereby a groomed data set may be compiled for subsequent analysis. In step 395, a distribution of data in a category of the groomed data set is determined. This distribution may be used for further decision making, with regard to call center logged data. Utilizing the groomed data set for decision making, with respect to resource allocation and such, may avoid the resource wasting issues described herein above.

Figure 4:
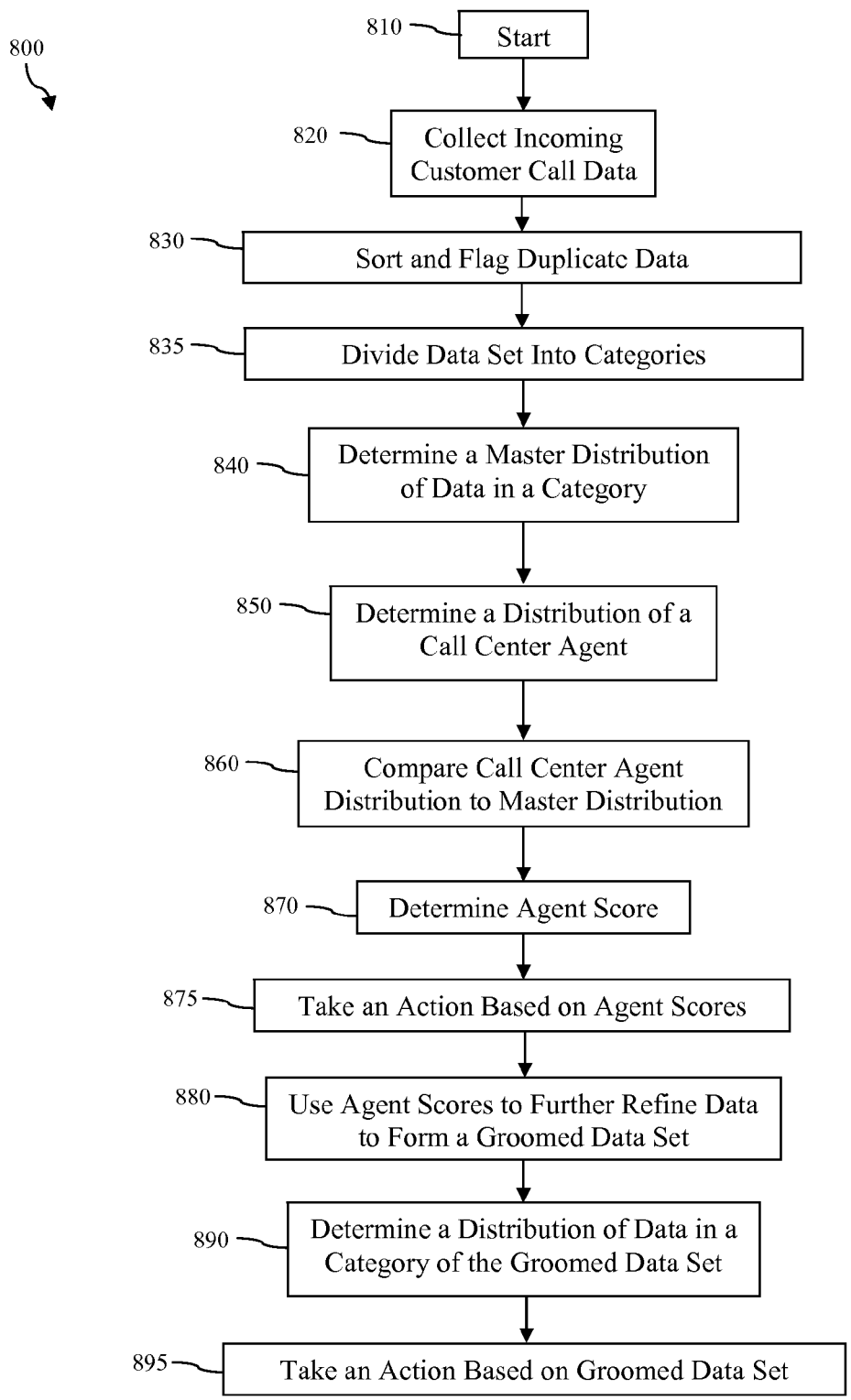
FIG. 4 is a flow chart, according to an embodiment of the disclosure.

FIG. 4 illustrates a flowchart of a method 800 of another embodiment of the disclosure. In step 810, the method begins. In step 820, incoming customer call data is collected, as described above with reference to block 320 in FIG. 3. In step 830, data sorted and duplicates are flagged (e.g. marked for removal and/or further scrutiny). In step 835 the data are divided into categories, as described above with reference to block 330 in FIG. 3. In step 840, a master distribution of data in a category is determined. A master distribution may be the overall distribution within a category (e.g. a Gaussian distribution). In step 850, a distribution of the data associated with an individual call center agent is determined. In step 860, the data of a call center agent is compared to the master data set. In this way, it may be possible to determine if a deviation of the data of the call center agent is such that it might indicate a problem with that call center agent's logging procedure. It may be that the data indicate that this call center agent is not properly logging data, if the agent's data does not sufficiently align with or reflect similar patters to the master data set. In step 870, a score or quality value of the call center agent of step 860 is determined. In an embodiment, an absolute deviation of the data of the call center agent from the master data may be determined. In an alternative embodiment, a standard deviation or other form of deviation or differentiation of the data of the call center agent from the data of the master data set may be used in order to determine whether or not a particular call center agent is reasonably well aligned with the data of the master set, and thereby deduce whether or not the call center agent is complying with the procedures he/she is supposed to be following in order to accurately record incoming call data.

In step 875, based on the comparing of step 870, an action may be taken regarding the call center agent of the comparison. For example, if the data of a call center agent deviates from the master data set by an appreciable amount, it may be advisable to discuss proper call logging procedures with the agent, provide additional training for the agent, or otherwise manage the agent in order to promote adhesion to proper call logging procedures. In step 880, multiple comparisons of call center agent data with that of the master data set may provide a means for further refining the data. For example, if the data of multiple call center agents is compared to the master data set, and a score is determined for each of the call center agents, it may be useful to compare all of the scores to determine whether or not there is some appreciable deviation of the scores among the call center agents. It may be that most of the call center agents have scores that closely resemble or approximate one another, while others may be considered outliers. While these outliers may not sufficiently deviate from the master data set to suggest that there may be an issue with the data logging procedures of a particular call center agent, some call center agents' data may be removed from the master set to form a groomed set, wherein the groomed set more closely portrays the actual data of incoming calls to the call center.

In step 890, in a manner similar to step 840, a distribution of data in a category of the groomed data set is determined. In step 895, an action may be taken, based on the distribution of the data of the groomed data set. For example, the distribution within the categories of the groomed data set may be useful in determining whether or not there is a customer issue that requires further investigation or action to remedy a situation that may, for example, be causing a widespread problem for customers. If, for example, a large number of customer complaints regarding cell phone coverage in a particular geographic location are receive in a given time period, it may mean that there is a problem with a base transceiver station in that area, or such. In this manner, the groomed data set may be useful for diagnosing and addressing problems that customers may be experiencing, and to thereby improve customer service and the related customer satisfaction.

In an embodiment, in addition to the suspect data discussed above, there may be additional forms of data that may be beneficial to remove to form the groomed data set. For example, duplicate records may exist in the database 150. In an embodiment, a customer care agent may accidentally duplicate an entry, which may lead to more than one identical record in the database 150. Whereas this duplication may be accidental, it may also be the case that a customer care agent, in the course of falsifying call records 160, may generate multiple entries with the same or similar data. For example, in order to generate extra call records 160, as in the example above wherein customer care agents may be rewarded based on the number of records they produce, a customer care agent may generate multiple records with the same or similar phone numbers. The customer care agent, in the course of falsifying records, may make up phone numbers to use in the falsified call records 160. In the course of doing so, the customer care agent may inadvertently make up phone numbers that are similar to each other. Locating and removing these duplicate entries may further provide a groomed data set with more usable data for decision making purposes. In an embodiment, any form of duplicated data may be identified and/or removed from the data set or the groomed data set to produce a further groomed data set. In addition, duplicative data may be multiple calls from a given phone number, area code, geography, or other to the same customer care agent in a given period of time. For example, if a specific customer care agent receives a large number of calls from the same area code in a single shift, it may be an indication that this customer care agent is attempting to bolster their apparent call volume by having a friend or relative call the call center repeatedly. Alternatively, high-frequency data may be an indication that there is a particular problem in a given area, such as a cell tower becoming inoperative, leading to a loss of service in the given area. For this and other reasons, it may be advisable to scrutinize this high-frequency data, carefully.

In another embodiment, low-volume data may be considered suspect data. For example, if a given customer care agent logs a number of calls in a given time period that is well below the average number of calls for other customer care agents, it may be an indication that this customer care agent is not correctly logging their calls. It may be appropriate to further scrutinize the call records 160 of this particular customer care agent, in order to ascertain whether or not they are properly logging calls according to their instructions.

In another embodiment, comparing a data set before grooming and after grooming may provide an indication of a confidence level. For example, if a larger number of call records 160 are removed from a data set, after careful scrutiny to identify suspect records, it may be an indication that a call center 110 has a systemic problem with customer care agents. For example, if 15% of all call records 160 in a database 150 are deemed to be suspect, it may be the case that the customer care agents in the call center 110 are insufficiently trained, and additional training may provide a smaller quantity of suspect call records 160, in the future. Conversely, a low number of suspect call records 160 may indicate a high degree of confidence that the customer care agents in the call center 110 are performing their logging tasks appropriately. In this embodiment, as stated above, the amount of "grooming" required to generate a "good" set of data may be an indication of the level of confidence management should have in the call records 160 being generated by this call center 110.

Figure 5:
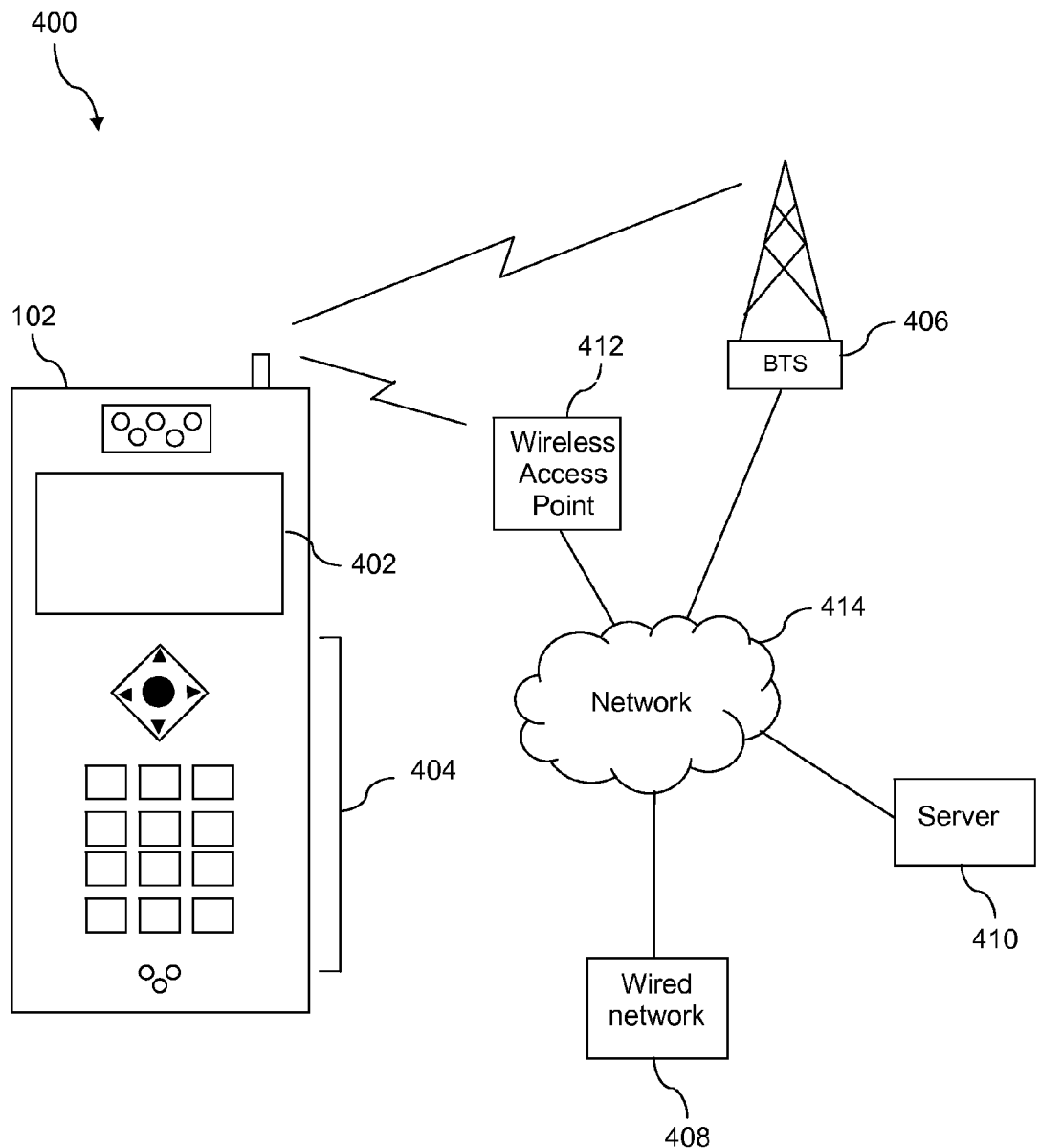
FIG. 5 is a wireless communication system, according to an embodiment of the disclosure.

FIG. 5 shows a wireless communications system 400 including the mobile device 102. FIG. 5 depicts the mobile device 102, which is operable for implementing aspects of the present disclosure, but the present disclosure should not be limited to these implementations. Though illustrated as a mobile phone, the mobile device 102 may take various forms including a wireless handset, a pager, a personal digital assistant (PDA), a gaming device, or a media player. The mobile device 102 includes a display 402 and a touch-sensitive surface and/or keys 404 for input by a user. The mobile device 102 may present options for the user to select, controls for the user to actuate, and/or cursors or other indicators for the user to direct. The mobile device 102 may further accept data entry from the user, including numbers to dial or various parameter values for configuring the operation of the handset. The mobile device 102 may further execute one or more software or firmware applications in response to user commands. These applications may configure the mobile device 102 to perform various customized functions in response to user interaction. Additionally, the mobile device 102 may be programmed and/or configured over-the-air, for example from a wireless base station, a wireless access point 412, a wireless network 414, or a peer mobile device 102.

The mobile device 102 may execute a web browser application which enables the display 402 to show a web page. The web page may be obtained via wireless communications with a base transceiver station (BTS) 406, a wireless network access node, a peer mobile device 102 or any other wireless communication network or system. While a single base transceiver station 406 is illustrated, it is understood that the wireless communication system may comprise additional base transceiver stations. In some instances, the mobile device 102 may be in communication with multiple base transceiver stations 406 at the same time. The base transceiver station 406 (or wireless network access node) is coupled to a wired network 408, such as the Internet. Via the wireless link and the wired network, the mobile device 102 has access to information on various servers, such as a server 410. The server 410 may provide content that may be shown on the display 402. Alternately, the mobile device 102 may access the base transceiver station 406 through a peer mobile device 102 acting as an intermediary, in a relay type or hop type of connection.

Figure 6:
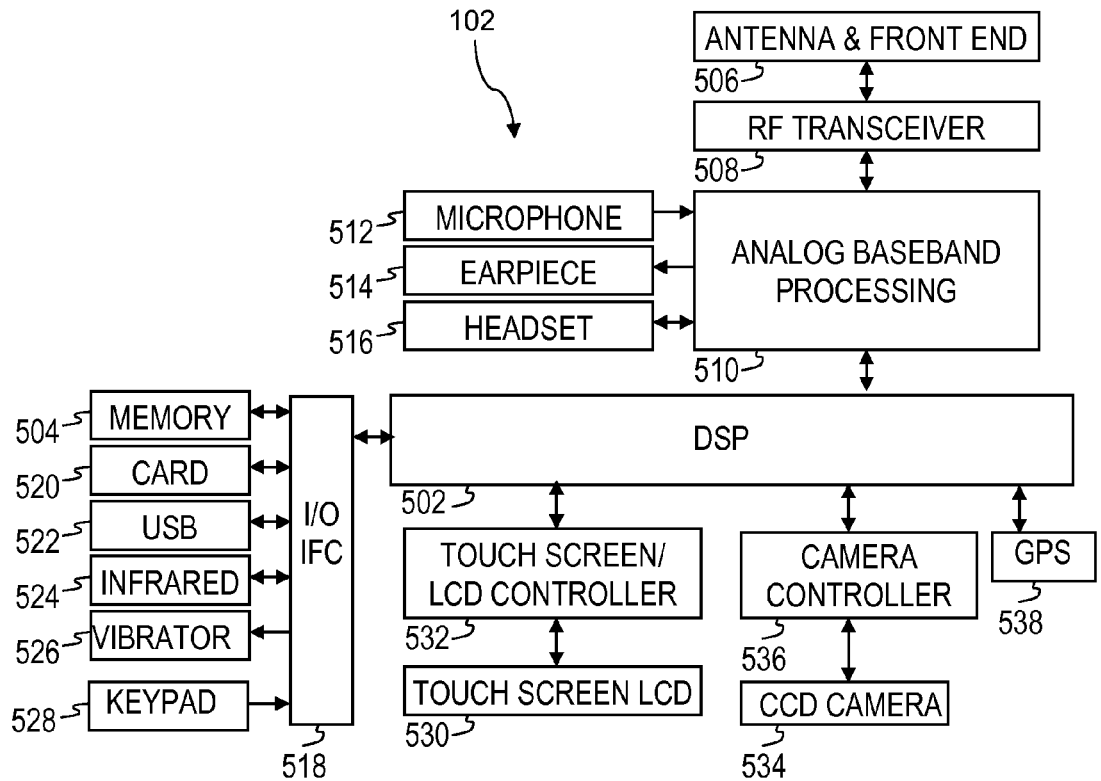
FIG. 6 is a diagram of a mobile device, according to an embodiment of the disclosure.

FIG. 6 shows a block diagram of the mobile device 102. While a variety of known components of handsets are depicted, in an embodiment a subset of the listed components and/or additional components not listed may be included in the mobile device 102. The mobile device 102 includes a digital signal processor (DSP) 502 and a memory 504. As shown, the mobile device 102 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538. In an embodiment, the mobile device 102 may include another kind of display that does not provide a touch sensitive screen. In an embodiment, the DSP 502 may communicate directly with the memory 504 without passing through the input/output interface 518. Additionally, in an embodiment, the mobile device 102 may comprise other peripheral devices that provide other functionality.

The DSP 502 or some other form of controller or central processing unit operates to control the various components of the mobile device 102 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 102 to function as a peripheral device to exchange information with a personal computer or other computer system. The infrared port 524 and other optional ports such as a BLUETOOTH interface or an IEEE 802.11 compliant wireless interface may enable the mobile device 102 to communicate wirelessly with other nearby handsets and/or wireless base stations.

The keypad 528 couples to the DSP 502 via the interface 518 to provide one mechanism for the user to make selections, enter information, and otherwise provide input to the mobile device 102. Another input mechanism may be the touch screen LCD 530, which may also display text and/or graphics to the user. The touch screen LCD controller 532 couples the DSP 502 to the touch screen LCD 530. The GPS sensor 538 is coupled to the DSP 502 to decode global positioning system signals, thereby enabling the mobile device 102 to determine its position.

Figure 7:
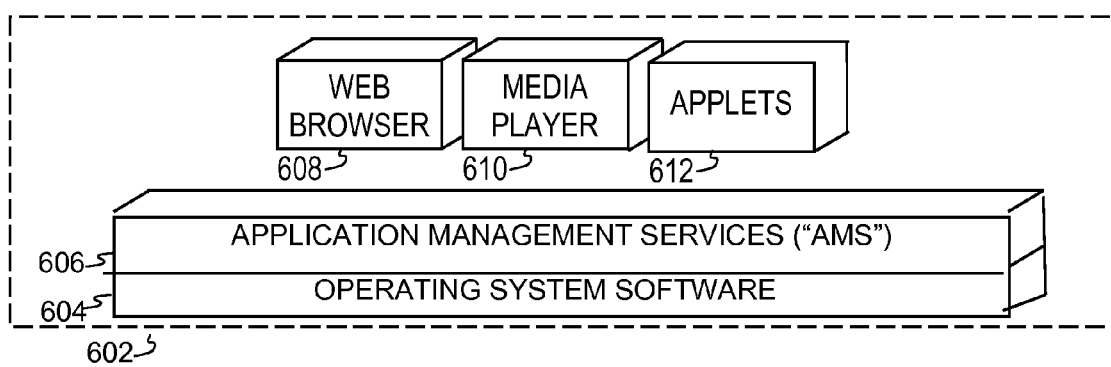
FIG. 7 is a software environment, according to an embodiment of the disclosure.

FIG. 7 illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services ("AMS") 606 that transfer control between applications running on the mobile device 102. Also shown in FIG. 7 are a web browser application 608, a media player application 610, and JAVA applets 612. The web browser application 608 configures the mobile device 102 to operate as a web browser, allowing a user to enter information into forms and select links to retrieve and view web pages. The media player application 610 configures the mobile device 102 to retrieve and play audio or audiovisual media. The JAVA applets 612 configure the mobile device 102 to provide games, utilities, and other functionality.

Figure 8:
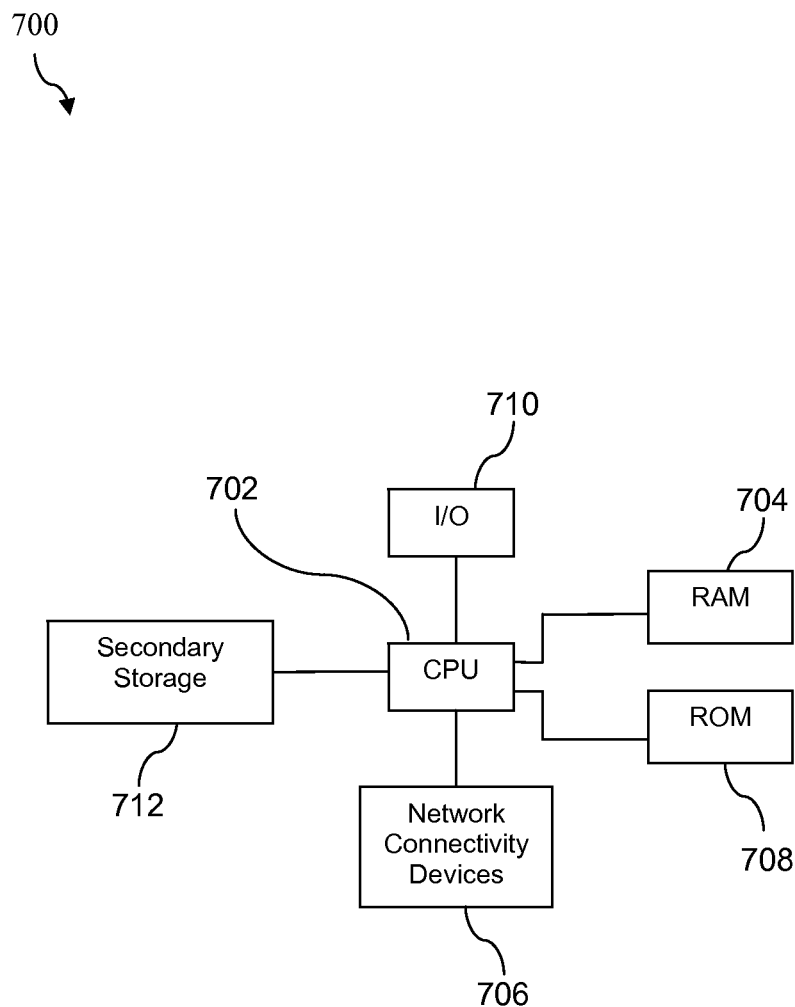
FIG. 8 illustrates a computer system suitable for implementing several embodiments of the disclosure.

FIG. 8 illustrates a computer system 700 suitable for implementing one or more embodiments disclosed herein. The computer system 700 includes a processor 702 (which may be referred to as a central processor unit or CPU) that is in communication with memory devices including secondary storage 712, read only memory (ROM) 708, random access memory (RAM) 704, input/output (I/O) devices 710, and network connectivity devices 706. The processor 702 may be implemented as one or more CPU chips.

It is understood that by programming and/or loading executable instructions onto the computer system 700, at least one of the CPU 702, the RAM 704, and the ROM 708 are changed, transforming the computer system 700 in part into a particular machine or apparatus having the novel functionality taught by the present disclosure. It is fundamental to the electrical engineering and software engineering arts that functionality that may be implemented by loading executable software into a computer may be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 712 is typically comprised of one or more disk drives or tape drives and is used for non-volatile storage of data and as an over-flow data storage device if RAM 704 is not large enough to hold all working data. Secondary storage 712 may be used to store programs which are loaded into RAM 704 when such programs are selected for execution. The ROM 708 is used to store instructions and perhaps data which are read during program execution. ROM 708 is a non-volatile memory device which typically has a small memory capacity relative to the larger memory capacity of secondary storage 712. The RAM 704 is used to store volatile data and perhaps to store instructions. Access to both ROM 708 and RAM 704 is typically faster than to secondary storage 712. The secondary storage 712, the RAM 704, and/or the ROM 708 may be referred to in some contexts as computer readable storage media and/or non-transitory computer readable media.

I/O devices 710 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 706 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 706 may enable the processor 702 to communicate with the Internet or one or more intranets. With such a network connection, it is contemplated that the processor 702 might receive information from the network, or might output information to the network in the course of performing the above-described method steps. Such information, which is often represented as a sequence of instructions to be executed using processor 702, may be received from and outputted to the network, for example, in the form of a computer data signal embodied in a carrier wave.

Such information, which may include data or instructions to be executed using processor 702 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 702 executes instructions, codes, computer programs, scripts which it accesses from hard disk, floppy disk, optical disk (these various disk based systems may all be considered secondary storage 712), ROM 708, RAM 704, or the network connectivity devices 706. While only one processor 702 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 712, for example, hard drives, floppy disks, optical disks, and/or other device, the ROM 708, and/or the RAM 704 may be referred to in some contexts as non-transitory instructions and/or non-transitory information.

In an embodiment, the computer system 700 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 700 to provide the functionality of a number of servers that is not directly bound to the number of computers in the computer system 700. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 700, at least portions of the contents of the computer program product to the secondary storage 712, to the ROM 708, to the RAM 704, and/or to other non-volatile memory and volatile memory of the computer system 700. The processor 702 may process the executable instructions and/or data structures in part by directly accessing the computer program product, for example by reading from a CD-ROM disk inserted into a disk drive peripheral of the computer system 700. Alternatively, the processor 702 may process the executable instructions and/or data structures by remotely accessing the computer program product, for example by downloading the executable instructions and/or data structures from a remote server through the network connectivity devices 706. The computer program product may comprise instructions that promote the loading and/or copying of data, data structures, files, and/or executable instructions to the secondary storage 712, to the ROM 708, to the RAM 704, and/or to other non-volatile memory and volatile memory of the computer system 700.

In some contexts, the secondary storage 712, the ROM 708, and the RAM 704 may be referred to as a non-transitory computer readable medium or a computer readable storage media. A dynamic RAM embodiment of the RAM 704, likewise, may be referred to as a non-transitory computer readable medium in that while the dynamic RAM receives electrical power and is operated in accordance with its design, for example during a period of time during which the computer 700 is turned on and operational, the dynamic RAM stores information that is written to it. Similarly, the processor 702 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A computer-based method of analyzing call center data comprising: collecting, by one or more computers, reports from a plurality of customer care agents, wherein each report comprises logged data of incoming customer calls; compiling, by the one or more computers, the reports from the plurality of customer care agents into an aggregate data set; determining, by the one or more computers, a number of total incoming calls in the aggregate data set; dividing, by the one or more computers, the aggregate data set into a plurality of categories based on the incoming calls; determining, by the one or more computers, an aggregate distribution for each of the plurality of categories, each aggregate distribution corresponding to a ratio of a number of incoming calls reported by the plurality of customer call agents as being associated with the corresponding category to the number of total incoming calls in the aggregate data set; compiling, by the one or more computers, reports from one of the plurality of customer care agents into an individual data set; determining, by the one or more computers, a number of total incoming calls in the individual data set; dividing, by the one or more computers, the individual data set into the plurality of categories; determining, by the one or more computers, an individual distribution for each of the plurality of categories, each individual distribution corresponding to a ratio of a number of incoming calls reported by the one of the plurality of customer call agents as being associated with the corresponding category to the number of total incoming calls in the individual data set for one or more of the plurality of categories, comparing, by the one or more computers, the individual distribution to the aggregate distribution; for the one or more of the plurality of categories, determining, by the one or more computers, a deviation of the individual distribution from the aggregate distribution, based on the comparison; for the one or more plurality of categories, determining, by the one or more computers, whether the deviation exceeds a threshold value; and taking action when determining that the deviation exceeds the threshold value.

2. The method of claim 1, wherein the deviation is determined as one of an absolute deviation and a standard deviation.

3. The method of claim 1, wherein the action comprises one or more of managing call center personnel, modifying call center personnel data logging procedures, and managing customer service.

4. The method of claim 3, wherein managing call center personnel comprises one or more of training call center personnel, hiring call center personnel, and terminating call center personnel, and monitoring call center personnel.

5. The method of claim 1, further comprising removing suspect data from the collected reports, wherein suspect data comprise one or more of duplicative data, low-volume data, high-frequency data, and fraudulent data.

6. The method of claim 5, wherein low-volume data comprise a number of calls to a given customer care agent that is below a pre-determined number of calls, in a given period of time.

7. The method of claim 5, wherein high-frequency data comprise calls with timestamps that are too short to represent an actual incoming customer call.

8. The method of claim 1, wherein comparing the individual distribution to the aggregate distribution provides a confidence level.

9. A computer-based method of analyzing call center data comprising: collecting, by one or more computers, data of incoming customer calls from a plurality of customer care agents to form an aggregate data set; determining, by the one or more computers, a number of total incoming calls in the aggregate data set; dividing, by the one or more computers, the aggregate data set into a plurality of categories based on types of incoming customer calls in the aggregate data set; determining, by the one or more computers, an aggregate distribution for each of the plurality of categories, each aggregate distribution corresponding to a ratio of a number of incoming calls reported by the plurality of customer call agents as being associated with the corresponding category to the number of total incoming calls in the aggregate data set; collecting, by the one or more computers, data of incoming customer calls from one of the plurality of customer care agents to form an individual data set; determining, by the one or more computers, a number of total incoming calls in the individual data set; dividing, by the one or more computers, the individual data set into the plurality of categories based on types of incoming customer calls in the individual data set; determining, by the one or more computers, an individual distribution for each of the plurality of categories, each individual distribution corresponding to a ratio of a number of incoming calls reported by the one of the plurality of customer call agents as being associated with the corresponding category to the number of total incoming calls in the individual data set; for one or more of the plurality of categories, comparing, by the one or more computers, the individual distribution to the aggregate distribution; for the one or more of the plurality of categories, determining, by the one or more computers, a deviation of the individual distribution from the aggregate distribution, based on the comparison; for the one or more of the plurality of categories, determining, by the one or more computers, whether the deviation exceeds a threshold value; removing at least a portion of the individual data set from the aggregate data set to form a, groomed data set when the deviation exceeds the threshold value; and identifying valid customer service issues based on analyzing the groomed data set distribution within the first category.

10. The method of claim 9, further comprising removing suspect data from the collected data, wherein suspect data comprises one or more of duplicative data, low-volume data, high-frequency data, and fraudulent data.

11. The method of claim 9, wherein the aggregate distribution corresponds to a ratio of an average number of incoming calls reported by the plurality of customer call agents as being associated with the corresponding category to the number of total incoming calls in the aggregate data set, and wherein the individual distribution corresponds to a ratio of an average number of incoming calls reported by the one of the plurality of customer call agents as being associated with the corresponding category to the total incoming calls in the individual data set.

12. A computer-based method of analyzing call center data comprising: collecting, by one or more computers, data of incoming customer calls from a plurality of customer call agents to form an aggregate data set; determining, by the one or more computers, a number of total incoming calls in the aggregate data set; dividing, by the one or more computers, the aggregate data set into a plurality of categories based on types of incoming customer calls in the aggregate data set; determining, by the one or more computers, an aggregate distribution for each of the plurality of categories, each aggregate distribution corresponding to a ratio of a number of incoming calls reported by the plurality of customer call agents as being associated with the corresponding category to the number of total incoming calls in the aggregate data set; collecting, by the one or more computers, data of incoming customer calls from one of the plurality of customer care agents to form an individual data set; determining, by the one or more computers, a number of total incoming calls in the individual data set; dividing, by the one or more computers, the individual data set into the plurality of categories based on types of incoming customer calls in the individual data set; determining, by the one or more computers, an individual distribution for each of the plurality of categories, each individual distribution corresponding to a ratio of a number of incoming calls reported by the one of the plurality of customer call agents as being associated with the corresponding category to the number of total incoming calls in the individual data set; for one or more of the plurality of categories, comparing, by the one or more computers, the individual distribution to the aggregate distribution; for the one or more of the plurality of categories, determining, by the one or more computers, a deviation of the individual distribution from the aggregate distribution, based on the comparison; setting, by the one or more computers, alarm levels at one or more predetermined threshold levels for deviation values to indicate areas of and for the one or more of the plurality of categories, determining, by the one or more computers, whether the determined deviation exceeds at least one of the one or more predetermined threshold levels.

13. The method of claim 12, wherein the alarm levels are set based on a pre-determined number of customer call types within the plurality of categories.

14. The method of claim 13, wherein customer call types are one or more of dropped calls, billing problems, and hardware problems.

15. The method of claim 12, further comprising removing suspect data from the collected data, wherein suspect data comprise one or more of duplicative data, low-volume data, high-frequency data, and fraudulent data.

16. The method of claim 15, wherein duplicative data comprise incoming call data to a given customer care agent from similar phone numbers.

17. The method of claim 15, wherein low-volume data comprise the number of calls to a given customer care agent being below a pre-determined number of calls in a given period.

18. The method of claim 15, wherein high-frequency data comprise calls with durations determined to be too short to represent an actual incoming customer call.

19. The method of claim 1, wherein taking an action comprises removing at least one report collected from the one of the plurality of customer care agents from the aggregate data set.

20. The method of claim 9, further comprising: dividing, by the one or more computers, the groomed data set into the plurality of categories based on types of incoming customer calls in the groomed data set; and determining, by the one or more computers, a groomed distribution for each of the plurality of categories, each groomed distribution corresponding to a ratio of a number of incoming calls in the groomed data set reported by the plurality of customer call agents as being associated with the corresponding category to the number of total incoming calls in the groomed data set.

* * * * *